US005631073A

United States Patent [19]

Riedel et al.

[11] Patent Number: 5,631,073
[45] Date of Patent: May 20, 1997

[54] NONWOVEN SHEET MATERIALS, TAPES AND METHODS

[75] Inventors: John E. Riedel, Hugo; Lauren K. Cran, Denmark Township, Washington County, both of Minn.

[73] Assignee: Minnesota Mining and Manufacturing Company, St. Paul, Minn.

[21] Appl. No.: 716,803

[22] Filed: Sep. 16, 1996

Related U.S. Application Data

[63] Continuation of Ser. No. 441,814, May 16, 1995, abandoned, which is a continuation-in-part of Ser. No. 114,376, Aug. 30, 1993, abandoned, which is a continuation-in-part of Ser. No. 830,063, Feb. 3, 1992, abandoned.

[51] Int. Cl.$^6$ ........................................ B32B 7/12
[52] U.S. Cl. ........................ 442/364; 442/407; 442/408; 442/415
[58] Field of Search ........................ 428/260, 261, 428/265, 272, 290, 296

[56] References Cited

U.S. PATENT DOCUMENTS

| | | | |
|---|---|---|---|
| Re. 24,906 | 12/1960 | Ulrich | 206/59 |
| 2,464,301 | 3/1949 | Francis | 154/46 |
| 2,607,711 | 8/1952 | Hendricks | 117/122 |
| 2,708,192 | 5/1955 | Joesting et al. | 117/122 |
| 3,121,021 | 2/1964 | Copeland | 117/122 |
| 3,485,706 | 12/1969 | Evans | 161/72 |
| 3,507,943 | 4/1970 | Such et al. | 264/103 |
| 3,575,782 | 4/1971 | Hansen | 161/141 |
| 3,737,368 | 6/1973 | Such et al. | 161/123 |
| 3,908,650 | 9/1975 | Dunshee et al. | 128/156 |
| 3,983,166 | 9/1976 | Samour | 260/481 |
| 4,083,913 | 4/1978 | Marshall | 264/121 |
| 4,112,177 | 9/1978 | Salditt et al. | 428/304 |
| 4,148,958 | 4/1979 | Tischer et al. | 428/196 |
| 4,292,360 | 9/1981 | Riedel | 428/171 |
| 4,303,724 | 12/1981 | Sergeant et al. | 428/229 |
| 4,316,830 | 2/1982 | Mallon | 260/29.6 MQ |
| 4,341,213 | 7/1982 | Cohen | 128/284 |
| 4,380,564 | 4/1983 | Cancio et al. | 428/167 |
| 4,451,314 | 5/1984 | Knoke et al. | 156/148 |
| 4,490,425 | 12/1984 | Knoke et al. | 428/90 |
| 4,490,427 | 12/1984 | Grant et al. | 428/107 |
| 4,511,615 | 4/1985 | Ohta | 428/198 |
| 4,576,852 | 3/1986 | Burgess et al. | 428/171 |
| 4,639,390 | 1/1987 | Shoji | 428/195 |
| 4,645,711 | 2/1987 | Winslow et al. | 428/355 |
| 4,728,571 | 3/1988 | Clemens et al. | 428/352 |
| 4,731,277 | 3/1988 | Groitzsch et al. | 428/137 |
| 4,749,423 | 6/1988 | Vaalburg et al. | 156/181 |
| 4,772,499 | 9/1988 | Greenway | 428/43 |
| 4,833,179 | 5/1989 | Young et al. | 522/183 |
| 4,844,973 | 7/1989 | Konishi et al. | 428/286 |
| 4,973,513 | 11/1990 | Riedel | 428/252 |
| 5,016,331 | 5/1991 | Dilo | 28/115 |
| 5,082,899 | 1/1992 | Sawyer et al. | 525/74 |
| 5,496,603 | 3/1996 | Riedel et al. | 428/40 |

FOREIGN PATENT DOCUMENTS

| | | | |
|---|---|---|---|
| 0418493 | 3/1991 | European Pat. Off. | D04H 1/44 |
| 1595300 | 9/1981 | Germany | D04H 1/54 |

OTHER PUBLICATIONS

R. Nettelnstroth, "Polyester fibres for high-bulk nonwovens—specification profiles and end-uses," *INB Nonwovens*, pp. 29–38 (Feb. 1991).

Derwent Publications Ltd., London, GB; AN 92–126174; JP A 057 950 (Nippon Ester KK) 25, Feb. 1992, Abstract.

*Primary Examiner*—Jenna Davis
*Attorney, Agent, or Firm*—Gary L. Griswold; Walter N. Kirn; Stephen W. Bauer

[57] ABSTRACT

Nonwoven sheet materials, and pressure sensitive adhesive tapes formed from nonwoven sheet materials are provided. The nonwoven sheet materials comprise a randomly interlaced fibrous web of tensilized nonfracturable staple fibers and binder fibers, wherein the fibrous web is pattern embossed, and is interbonded by a chemical bonding agent, physical entanglement, or a combination thereof, and further wherein the nonwoven sheet material is readily fingertearable in the cross web direction. Methods of making nonwoven sheet materials and adhesive tapes are also provided.

30 Claims, No Drawings

NONWOVEN SHEET MATERIALS, TAPES AND METHODS

This application is a continuation of U.S. patent application Ser. No. 08/441,814, filed May 16, 1995, now abandoned, which is a continuation-in-part of application U.S. Ser. No. 08/114,376 filed Aug. 30, 1993, now abandoned, which is a continuation-in-part of U.S. Ser. No. 07/830,063 filed Feb. 3, 1992, now abandoned.

FIELD OF THE INVENTION

The present invention relates to nonwoven sheet materials, and tapes made therefrom, and in particular, to improved nonwoven sheet materials and tapes that exhibit enhanced tear characteristics, wet and dry strength, and good Hand values.

BACKGROUND OF THE INVENTION

Nonwoven sheet materials are often used as the backing or web component of tapes and the like. These tapes are commonly used in the health-care industry for affixation of a variety of articles, such as dressings and tubings, and as backings and affixation materials for pre-made dressings, such as first-aid dressings and island-type dressings. They are also commonly used as affixation materials on certain types of products, such as diagnostic electrodes, surgical grounding plates, and monitoring electrodes.

Tapes formed from nonwoven sheet materials fall into two general categories based on performance needs. Category I includes sheet materials, and tapes made therefrom, that can be torn in the cross machine or cross web direction. However, these materials often cannot be torn cleanly, and therefore, display uneven or irregular torn edges. On the other hand, category II includes those sheet materials and tapes that, for practical purposes, cannot be torn in either the machine or web direction or the cross web direction.

In general, category I nonwoven materials are predominantly comprised of cellulosic fibers, and exhibit a web direction to cross web direction tensile strength ratio of less than 2.5 to 1. Cellulosic fibers are inherently fracturable (i.e., are easily broken under stress), as opposed to many synthetic, polymeric fibers, that are essentially nonfracturable.

The cellulosic fibers used in category I sheet materials are typically bonded together by a chemical binder that immobilizes, or partially immobilizes the fibers. In addition, the chemical binder increases the density of the sheet materials, and provides other advantageous properties, such as enhanced tensile strength, elongation at break, Hand (i.e., conformability), fuzzing, and the specific tear characteristics noted above. However, these advantageous properties are rapidly compromised when the sheet material becomes wet, and especially when it becomes saturated with water or other water-based fluids.

Category II materials are most frequently formed from essentially nonfracturable synthetic fibers, and are either thermally, mechanically, or chemically bonded to provide structural integrity to the sheet materials. These materials can display enhanced tensile strength, elongation, Hand, and fuzz formation depending on their particular construction. For example, mechanically bonded category II materials are typically softer and more fuzzy, in comparison with the chemically bonded materials, that tend to be stiffer and less fuzzy. However, in virtually all instances, category II sheet materials are essentially incapable of being torn in the cross web direction, and thus, do not meet the affixation requirements of the health-care industry.

Both category I and II nonwoven sheet materials and tapes enjoy reasonably extensive use in the wound treatment and medical device affixation areas of the practice of healthcare. However, neither type of material has been able to make significant advances into the broader areas of the health-care market due to their inherent limitations.

Category I materials lack water resistance, and are unable to provide sufficient strength, while still maintaining softness, Hand and/or reasonable tear characteristics. Strength can be improved by changing the web direction to cross web direction orientation ratios of the fibers at the expense of tear. In addition, strength can also be improved by increasing the basic fiber content and weight at the expense of Hand and tear.

Altering the characteristics of category II sheet materials made with synthetic polymer fibers is even more restrictive. Reasonably good tear can only be achieved by utilizing fibers that make the sheet materials, and resulting tapes, very stiff. In so doing, the fiber-to-fiber bonds are essentially locked-up, thereby reducing fabric conformability, and providing a tear which is extremely difficult, and not satisfactory in terms of ragged edges and failure to tear straight.

Many attempts have been made in recent years to enhance the characteristics of category I and II materials, or to provide nonwoven sheet materials and tapes with the desirable characteristics of both category I and II materials. In so doing, different fiber types, contents, and weights of the nonwoven sheet materials have been tried. In addition, various bonding techniques, including bonding with a chemical sizing agent, physical entanglement of the web (e.g., hydroentanglement) and thermal bonding, such as through thermal embossing, have been employed. See, e.g., U.S. Pat. No. 4,973,513 (chemical bonding with LAB), U.S. Pat. No. 4,341,213 (chemical bonding to increase strength and flammability), U.S. Pat. No. 4,772,499 (hydroentanglement and partial chemical bonding), U.S. Pat. No. 3,737,368, and U.S. Pat. No. 3,507,943 (thermal embossing with engraved rollers).

For example, U.S. Pat. No. 3,121,021 discloses surgical adhesive tape formed from a tissue backing of rayon staple fibers coated with a non-tacky hydrophobic rubbery fiber-sizing polymer. The polymer-bonded backing is coated with a thin layer of pressure-sensitive adhesive that exhibits a microporous structure after drying. Incorporation of the hydrophobic rubbery fiber-sizing polymer serves to increase the water repellency, and thus, the wet strength of this category I material. Similarly, U.S. Pat. No. 4,112,177 provides essentially the same nonwoven backing as with U.S. Pat. No. 3,121,021, however, multiple adhesive layers are applied to the backing to improve the overall adhesive properties of the tapes formed therefrom. A further example of a porous, double-coated adhesive tape is disclosed in U.S. Pat. No. 4,844,973.

U.S. Pat. No. 4,292,360 discloses a multi-ply nonwoven sheet material that can be used to make pressure-sensitive adhesive tapes. The sheet materials are comprised of two nonwoven webs that are overlaid and bonded together by a rewettable chemical binder. The nonwoven webs can be formed of any type or combination of staple fibers, either alone, or in combination with binder fibers. In addition to the chemical binder, the sheet materials can also be optionally calendered or embossed.

U.S. Pat. No. 3,908,650 discloses a microporous tape formed from a nonwoven web coated on one side with a porous layer of a pressure-sensitive adhesive, and on the other with a porous thermoplastic film. The fibers adjacent the thermoplastic layer are, at least to some extent, water repellent. Optionally, the fibrous web may be thermally bonded or chemically bonded with a sizing agent. Utilization of the thermoplastic layer imparts increased abrasion and soil resistance to the overall tape.

U.S. Pat. No. 4,772,499 discloses a nonwoven web that is readily tearable in the cross web direction. The tearability of the web is enhanced by pattern bonding portions of the web with a bonding agent. After drying, the web is stated to be readily tearable in the cross web direction along the non-bonded portions of the web. Also, U.S. Pat. No. 4,303,724 discloses the use of texturized or false twist yarns in the filing of nonwoven fabrics to improve their tear characteristics.

West German Patent No. DE 1 595 300 discloses nonwoven fabrics formed from wet-laid webs that are hot calendered while the web still retains from 10% to 40% by weight residual moisture. These webs are comprised of unstretched polyester binder fibers, and optionally can include stretched polyester fibers, polyacrylamide fibers, and/or polyamide imide fibers. Further examples of thermal bonding as the principal means of reinforcing nonwoven materials can also be found in U.S. Pat. Nos. 4,731,277, 4,639,390, 4,511,615, 4,490,427, and 4,083,913. In addition, thermal bonding can be brought about by embossing such sheet materials using heated, engraved rollers. See, e.g., U.S. Pat. Nos. 3,737,368 and 3,507,943.

U.S. Pat. No. 4,490,425 discloses a soft and fluffy nonwoven fabric formed by thermal bonding staple fibers, endless fibers, or both, and needle puncturing (i.e., tacking) one or both sides of the fabric to form the fluffy surface. Thereafter, one or more of the sides are coated with a thermal adhesive to yield a fabric useable as an interlining in various garments. Similar interlining materials and methods of their preparation are also disclosed in U.S. Pat. Nos. 4,451,314 and 4,148,958.

None of the previously described fabrics or tapes has successfully combined the advantages of category I and II materials, while eliminating their shortcomings. In fact, to date, no single nonwoven sheet material, or tape made therefrom, exhibits enhanced dry strength, comparable wet strength, and ease of tear in the cross web direction, while maintaining reasonable Hand values.

SUMMARY OF THE INVENTION

The present invention provides nonwoven sheet materials, and tapes formed therefrom, made with tensilized nonfracturable staple fibers and binder fibers, and formed from a combination of interbonding and pattern embossing techniques. These sheet materials are especially useful as tape backing fabrics that are finger tearable in the cross web direction within the requirements of the user community, and also possess a number of other desirable properties, including enhanced dry strength, comparable wet strength, low Hand measurements, and a web direction tensile strength to cross machine direction tensile strength ratio of preferably less than 3:1.

In particular, the present invention provides a nonwoven sheet material comprising a randomly interlaced fibrous web of tensilized nonfracturable staple fibers and binder fibers, wherein the fibrous web is pattern embossed, and is interbonded by a chemical bonding agent, physical entanglement, or a combination thereof, and further wherein the nonwoven sheet material exhibits a Hand measurement of less than 250 grams for about a 20 cm square sheet, and is readily finger-tearable in the cross web direction. In a preferred embodiment, the nonwoven sheet material is also readily finger tearable in the cross web direction. Further in a preferred embodiment the nonwoven sheet material is single ply.

Also, the present invention can provide a pressure-sensitive adhesive tape comprising a nonwoven backing with first and second surfaces, the nonwoven backing having a pressure-sensitive adhesive coated on the first surface, wherein the nonwoven backing comprises tensilized nonfracturable staple fibers and binder fibers randomly interlaced together to form a fibrous web, the fibrous web being pattern embossed, and interbonded by a chemical bonding agent, physical entanglement, or combinations thereof, and further wherein the adhesive tape exhibits a Hand measurement of less than 250 grams for about a 20 cm square sheet, and is readily finger-tearable in the cross web direction. Preferably, the fibrous web is single ply.

Further, the present invention can provide a method of making a nonwoven sheet material comprising: (a) forming a randomly interlaced fibrous web of tensilized nonfracturable staple fibers and binder fibers; (b) pattern embossing the fibrous web; and (c) interbonding the fibrous web using a chemical bonding agent, physical entanglement, or a combination thereof, to form a nonwoven sheet material, wherein the nonwoven sheet material exhibits a Hand measurement of less than 250 grams for about a 20 cm square sheet, and is readily finger-tearable in the cross web direction.

These and various other advantages and features of novelty which characterize the invention are pointed out with particularity in the claims annexed hereto and forming a part hereof. However, for a better understanding of the invention, its advantages, and objects obtained by its use, reference should be had to the accompanying descriptive matter, in which there is illustrated and described preferred embodiments of the invention.

DETAILED DESCRIPTION OF EMBODIMENTS OF THE INVENTION

Nonwoven Sheet Materials

The fibrous web component of the nonwoven sheet materials and tapes according to the present invention is made in accordance with conventional methods known in the art, including wet-laid methods, dry-laid methods, such as air layering and carding, and direct-laid methods, such as spunbonding and meltblowing. Examples of such methods are disclosed in U.S. Pat. No. 3,121,021 to Copeland, and U.S. Pat. No. 3,575,782 to Hansen, the disclosures of which are herein incorporated by reference.

Both tensilized nonfracturable staple fibers and binder fibers are used in the formation of the fibrous web component of the nonwoven sheet materials and tapes of the present invention. As used herein, "tensilized nonfracturable staple fibers" refer to staple fibers, formed from synthetic polymers, that are drawn during manufacture, such that the polymer chains substantially orient in the machine direction or web direction of the fiber, and that will not readily fracture when subjected to a moderate breaking force. The controlled orientation of these staple fibers imparts a high degree of ordered crystallinity (e.g. generally above about 45% crystallinity) to the polymer chains comprising the fibers. Generally, the tensilized nonfracturable staple fibers of the present invention will not fracture unless subjected to a breaking force of at least 3.5 g/denier. The terms "machine direction" and "web direction" are used interchangeably and refer to the lengthwise direction of the web. The fibers which comprise the nonwoven sheet materials orient in the web direction of the nonwoven sheet materials. The terms "cross machine direction" and "cross web direction" are used interchangeably herein and refer to a direction about perpendicular to the web direction of the nonwoven sheet materials.

Nonlimiting examples of suitable tensilized nonfracturable staple fibers according to the present invention include polyester staple fibers, polyolefin staple fibers, polyamide staple fibers, polyacrylate staple fibers, polycarbonate staple fibers, polysulfone staple fibers, or combinations thereof.

Preferably, the tensilized nonfracturable staple fibers comprise oriented polyolefin staple fibers, such as oriented polyethylene, polypropylene, or polybutylene staple fibers, oriented polyester staple fibers, such as polyethylene terephthalate (PET), or combinations thereof. These oriented staple fibers are preferably from about 1 cm to about 10 cm, more preferably, 2 cm to 5 cm in length, and display a fineness of from about 0.1 denier to about 20 denier, more preferably from about 0.5 denier to about 5 denier, and most preferably from about 0.7 denier to about 2 denier.

In a particularly preferred embodiment, the tensilized nonfracturable staple fibers comprise oriented polyester staple fibers, such as 0.75 denier polyester staple fibers (type L-30, polyethylene terephthalate (PET); Eastman Chemical Products, Inc., Kingsport, Tenn.; or, standard polyester staple fibers (PET); Hoechst Celanese, Charlotte, N.C.), 1.25 denier polyester staple fibers (Style T-131, PET; Hoechst Celanese Corp., Charlotte, N.C.), and/or 2.0 denier standard polyester staple fibers (PET) (Hoechst Celanese Corp., Charlotte, N.C.).

Any type or types of binder fibers can be employed to form the fibrous web of the present invention, as long as they are capable of melt-bonding to the tensilized nonfracturable staple fibers of the fibrous web without fracturing, or substantially weakening the tensilized nonfracturable staple fibers. In this regard, it is preferable that the binder fibers be formed from one or more man-made thermoplastic polymers that are capable of melt-bonding with the tensilized nonfracturable staple fibers used in the nonwoven sheet materials and tapes of the present invention. Furthermore, the binder fibers can comprise a wide variety of binder fiber configurations that are well known in the art, including, without limitation, totally meltable binder fibers, side-by-side binder fibers, bicomponent binder fibers, elliptical core-sheath binder fibers, concentric core-sheath binder fibers, or combinations thereof.

Examples of suitable binder fibers, include, without limitation, polyester binder fibers, polyolefin binder fibers, such as thermoplastic polyethylene, polypropylene, and polybutylene binder fibers, polyamide binder fibers, or combinations thereof. These binder fibers are preferably from about 1 cm to about 20 cm, more preferably, 2 cm to 10 cm in length, and display a fineness of from about 0.1 denier to about 20 denier, more preferably from about 0.2 denier to about 10 denier, and most preferably from about 0.5 denier to about 6 denier.

In a particularly preferred embodiment, the binder fibers comprise core-sheath binder fibers containing, for example, an oriented polyester or polyolefin fiber core surrounded by an outer sheath of a meltable polyester or polyolefin resin. Specific examples of suitable core-sheath binder fibers for use in the fibrous webs of the present invention include Diawa™ binder fibers (1.5 denier, 38 mm, crystalline polypropylene core and meltable polyethylene sheath; Chori America, Inc., Los Angeles, Calif.); Melty™ binder fiber (2 denier, 38 mm, oriented polyester core and meltable polyester sheath; Chori America, Inc.); K-52 binder fibers (2 denier, 38 mm, oriented polyester core and meltable polyester sheath; Hoechst Celanese Corp., Charlotte, N.C.); and K-54 binder fibers (2 denier, 38 mm, oriented polyester core and meltable polyester sheath; Hoechst Celanese Corp., Charlotte, N.C.).

The weight ratio of tensilized nonfracturable staple fibers to binder fibers in the fibrous web will depend upon the application to which the nonwoven sheet materials or tapes of the present invention are to be put. In most cases, predetermined strength, tearability, and other requirements of the nonwoven sheet materials and tapes of the present invention can be obtained by balancing the quantity of high-strength, tensilized nonfracturable staple fibers against the quantity of thermoplastic binder fibers needed to insure adequate binding, and ultimately, the structural integrity of the fibrous web.

Generally, from about 95% to about 50%, preferably from about 90% to about 60% by weight of the fibrous web will be comprised of one or more varieties of tensilized nonfracturable staple fibers, while from about 50% to about 5%, preferably from about 40% to about 10% by weight of the fibrous web will be binder fibers. In a preferred aspect, the weight ratio of tensilized nonfracturable staple fibers to binder fibers will be from about 10:1 to about 1:10, more preferably from about 5:1 to about 1:1, and most preferably from about 4:1 to about 2:1.

The thickness of the fibrous web which forms the major component of the nonwoven sheet materials according to the present invention is largely dependent upon the desired use. In general, the fibrous web can be from about 0.04 mm to about 0.5 mm in thickness. When the desired end use of the nonwoven sheet material is as a backing for medical tape, it is preferred that the fibrous web have a thickness of from about 0.15 mm to about 0.4 mm. In addition, the weight of the fibrous web can be from about 10 g/m$^2$ to about 100 g/m$^2$, preferably from about 15 g/m$^2$ to about 70 g/m$^2$, and more preferably from about 20 g/m$^2$ to about 50 g/m$^2$.

In accordance with the principles of the present invention, the fibrous web is interbonded with a chemical bonding agent, through physical entanglement, or both, and is pattern embossed to yield the nonwoven sheet materials of the present invention. In practice, it is important that the sequence of interbonding and pattern embossing steps applied to the fibrous web be carried-out in a certain order. The application of a chemical binding agent to the fibrous web should be the last step in the treatment of the web, and when utilized, interbonding by physical entanglement should be the first step. For example, in one embodiment, the fibrous web is first physically entangled, then pattern embossed, and finally saturated with a chemical binding agent, to yield a nonwoven sheet material according to the present invention.

One method of interbonding the fibrous web is to physically entangle the fibers after formation of the web by conventional means well known in that art. For example, the fibrous web can be needle-tacked as shown in U.S. Pat. No. 5,016,331, the disclosure of which is herein incorporated by reference. In an alternative, and preferred method, the fibrous web can be hydroentangled, such as described in U.S. Pat. No. 3,485,706, the disclosure of which is herein incorporated by reference. One such method of hydroentangling involves passing a fibrous web layered between stainless steel mesh screens (e.g., 100 mesh screen, National Wire Fabric, Star City, Ariz.) at a predetermined rate (e.g., about 23 m/min) through high pressure water jets (e.g., from about 3 MPa to about 10 MPa), that impinge upon both sides of the web. Thereafter, the hydroentangled webs are dried, and can be subjected to pattern embossing and chemical binder saturation, as described herein.

All of the nonwoven sheet materials according to the present invention are pattern embossed, according to procedures well known in the art, such as those described in U.S. Pat. No. 2,464,301, No. 3,507,943, and No. 3,737,368, the disclosures of which are herein incorporated by reference. In general, the fibrous web is passed through a metal roll that is patterned (e.g., engraved) with raised and depressed areas, and a solid back-up roll, generally formed of metal or rubber. However, the fibrous web can also be fed between two patterned rolls displaying corresponding or alternating engraved areas. In either case, it is typical to supply heat to one or more of the rolls so that the fibrous web is thermally bonded along the points of pattern contact.

In a preferred embodiment, the fibrous webs according to the present invention are thermally embossed with a pattern roll and a solid back-up roll. During embossing, it is important to closely control the temperature of the pattern roll. In general, the temperature must be such that the tensilized nonfracturable staple fibers and binder fibers are thermally fused at the points of contact without fracturing the staple fibers, or seriously weakening the fibrous web below a useable strength level. In this regard, it preferred to maintain the temperature of the pattern roll between about 120° C. and 180° C., more preferably between about 125° C. and 145° C. In addition, the pattern roll should contact the nonwoven sheet material at a pressure of from about 0.10 MPa to about 0.30 MPa, more preferably from about 0.15 MPa to about 0.25 MPa.

The particular pattern engraved on the embossing roll will depend upon the intended use for the resulting nonwoven sheet materials and tapes. However, with standard medical tapes, it is preferable to use either a linear pattern that thermally embosses a series of lines along the cross web direction of the sheet material/tape backing, or a cross-hatch (i.e., square) pattern, that results in a series of intersecting embossed lines running in both the web direction and cross web direction on the sheet material/tape backing. In a preferred embodiment, the cross-hatch pattern is comprised of a series of squares formed from embossed lines of about 0.01 mm to about 0.05 mm in width, separated from each other by a square-shaped, un-embossed area of from about 0.05 mm to about 0.1 mm on each side.

The embossed surface area of the nonwoven sheet materials should comprise no more than about 95%, preferably less than about 80%, more preferably less than about 50%, and most preferably less than about 30% of the total surface area of the fibrous web. However, in no instance should 100% of the surface area of the fibrous web be thermally embossed (i.e. hot calendered). In preferred embodiments of the present invention, a linear, cross web direction embossed pattern preferably results in an embossed area of from about 10% to about 20%, while a square, cross-hatch pattern results in about a 25% to 35% embossed area.

A wide variety of chemical binding agents can be applied to the fibrous webs of the present invention by art-recognized processes. Nonlimiting examples of useful chemical binding agents include acrylics, vinyl acrylics, acetate/ethylene, polyvinyl acetate, and the like. Whatever chemical binder is employed, it should have an affinity for, and readily bind with, the tensilized nonfracturable staple fibers and/or binder fibers comprising the fibrous web.

It is preferable that the chemical binding agent comprise a water-based chemical binder, including, without limitation, latexes incorporating acrylics, styrene/butadiene rubbers, vinyl acetate/ethylenes, vinyl acetate/acrylates, polyvinyl chloride, polyvinyl alcohols, polyurethanes, vinyl acetates, acrylic/vinyl acetate, and the like. These water-based chemical binders are typically applied to the fibrous web at about 25% to about 35% solids, using any suitable coating method, including, wire-wound rod, reverse roll, air knife, direct and offset gravure, trailing blade, print bond, foam, and spray coating methods.

Specific examples of preferred chemical binding agents according to the present invention, include, without limitation, Rhoplex™ E-2559 (an approximately 45% solids acrylic latex binder; Roban & Haas Co., Philadelphia, Pa.), UNOCAL™ type 76-4402 (an approximately 50% solids styrene/butadiene rubber latex; UNOCAL Corp., Charlotte, N.C.), and National Starch™ No. 78-6283 (an approximately 45% solids acrylic/vinyl acetate copolymer latex; National Starch Corp., Bridgewater, N.J.), with National Starch™ No. 78-6283 being particularly preferred.

The chemical binding agent is applied in amounts sufficient to provide the desirable properties, such as dry strength, wet strength, and tear properties, demonstrated by the nonwoven sheet materials and tapes of the present invention. However, the amount of chemical binding agent employed can be varied depending upon the intended use. For example, more chemical binding agent may be applied to increase the strength of the nonwoven sheet materials, while less binder may be used to lower the Hand (i.e., improve conformability) of the materials.

In general, when the fibrous web is saturated with a chemical binding agent to form the nonwoven sheet materials and tapes of the present invention, the weight of the chemical binding agent in the fibrous web, after being dried, is from about 10 g/m$^2$ to about 40 g/m$^2$, preferably from about 15 g/m$^2$ to about 30 g/m$^2$. In this regard, it is preferred that the weight ratio of the fibers comprising the fibrous web to the chemical binding agent incorporated in the fibrous web be from about 5:1 to about 1:5, more preferably from about 3:1 to about 1:3, and most preferably from about 2:1 to 1:2.

The fibrous web according to the present invention can also optionally incorporate a water-based release coating, such as a low-adhesion backsize (LAB), at essentially the same time as, or after incorporation of, the chemical binding agent into the web. Preferred useable LAB's comprise those listed in, and applied by the methods described in, U.S. Pat. No. 4,973,513, the disclosure of which is herein incorporated by reference. After the chemical binding agent, and optional LAB, is applied, the fibrous web is dried using any appropriate drying means, such as contact drying, circulating air ovens, impingement ovens, through-air ovens, and the like.

Presently, there are two particularly preferred general constructions of nonwoven sheet materials in accordance with the present invention. In a first embodiment, the preferred nonwoven sheet material comprises a fibrous web of about 80% by weight of about a 1 denier, 4 cm length, oriented polyester staple fiber combined with about 20% by weight of about a 2 denier, 5 cm length, polyester binder fiber, having an average total fiber weight of about 20 g/m$^2$. This fibrous web is pattern embossed with a square, cross-hatch pattern that results in about 28% bonded surface area. Thereafter, the embossed fibrous web is saturated with a water-based acrylic copolymer chemical binding agent, diluted to about 28% solids, and dried to a binder weight of about 15 g/m², to yield nonwoven sheet materials according to the present invention.

The second preferred nonwoven sheet material comprises essentially the same material as the first embodiment, except that the fibrous web is hydroentangled prior to being pattern embossed, and the total fiber weight is increased to about 50 g/m², while the binder weight is increased to about 25 g/m². Thus, the ratio of total fiber weight to binder weight is approximately 2:1 versus essentially 1:1 for the first preferred embodiment.

Tapes

After the fibrous web has been interbonded and pattern embossed to form the nonwoven sheet materials of the present invention, the sheet materials may be wound in a roll for transportation, and later application of an adhesive, or other appropriate coatings used to form standard medical tapes and the like. Alternatively, the nonwoven sheet material may be conveyed directly to an adhesive coater, followed by slitting into individual tape rolls.

Preferably, the nonwoven sheet materials are coated with a layer of pressure-sensitive adhesive to form the tapes according to the present invention. In this regard, the pressure-sensitive adhesive that is applied to the nonwoven sheet materials may be solvent-based, water-based, or a hot-melt adhesive. Suitable adhesives, and their methods of application, are described, for example, in U.S. Pat. No. 2,708,192 (phenolic cured rubber based adhesives), U.S. Pat. No. Re 24,906 (water-based and solvent-based adhesives), and U.S. Pat. No. 4,833,179 (hot-melt adhesives), the disclosures of which are all incorporated herein by reference.

In a preferred embodiment, the nonwoven sheet materials of the present invention are coated with a high-solids latex pressure-sensitive adhesive that is moisture insensitive, while also displaying an excellent balance of adhesive properties, such as high compliance, and high shear, without adhesive build. See e.g., copending and co-filed patent application Ser. No. 07/829,899, pending, Lu et al., assigned to the assignee of the present invention, the disclosure of which is herein incorporated by reference. The characteristics and advantages of the preferred pressure-sensitive adhesive derive, at least in part, from the presence of a polymerizable surfactant and a low molecular weight hydrophobic polymer in the latex formulation.

The preferred latex pressure-sensitive adhesives coated on the nonwoven sheet materials of the present invention are produced by emulsifying a mixture of water, acrylate and vinyl monomers, ionic copolymerizable surfactant, optional chain transfer agent, optional crosslinker, and hydrophobic polymer. The emulsion is heated with agitation under nitrogen atmosphere, then treated with initiator in portions to maintain temperature control. The reaction mixture is heated and agitated until reaction is complete. The resulting acrylic latex can then be coated according to a variety of conventional methods known by those skilled in the art.

The acrylate monomer component of the latex pressure-sensitive adhesive preferably comprises $C_4$ to $C_{12}$ alkyl ester acrylate monomers. Suitable alkyl ester acrylate monomers include, without limitation, n-butyl acrylate, amyl acrylate, hexyl acrylate, isooctyl acrylate, 2-ethylhexyl acrylate, isononyl acrylate, decyl acrylate, dodecyl acrylate, and mixtures thereof.

Furthermore, the vinyl monomers combined with the acrylate monomers preferably comprises 1) vinyl esters including but not limited to vinyl acetate, vinyl propionate, vinyl butyrate, and the like, 2) $C_1$ to $C_4$ alkyl esters of (meth)acrylic acid (including but not limited to methyl methacrylate, methyl acrylate, ethyl acrylate, ethyl methacrylate, isobutyl methacrylate, and the like), 3) styrene, and mixtures thereof.

Examples of useful copolymerizable ionic surfactants in the preferred latex pressure-sensitive adhesive include, but are not limited to, those described in WO 89/12618, incorporated by reference herein. The surfactants described therein have a hydrophobic portion containing alpha-beta ethylenic unsaturation, a hydrophilic portion containing a poly(alkyleneoxy) segment, and an ionic segment. The preferred copolymerizable surfactant is MAZON SAM-211 surfactant (PPG Industries, Inc.; described as an ethylene polyalkoxy ammonium sulfate, wherein the number of alkoxy groups is between about 5 and about 25, with a typical example having about 15 to about 20 ethoxy groups).

The latex pressure-sensitive adhesive may optionally further comprise a crosslinking agent, including, without limitation, multifunctional acrylates such as diacrylates, triacrylates, and tetraacrylates, such as 1,6-hexanedioldiacrylate, poly(ethylene glycol)diacrylates, poly (butadine)diacrylates, polyurethane diacrylates, and trimethylolpropane triacrylate; 4-acryloxybenzophenone; divinyl benzene; and mixtures thereof. Also, optional chain transfer agents, such as carbon tetrabromide, mercaptans, alcohols, and mixtures thereof may be included.

As noted above, the preferred latex pressure-sensitive adhesive includes a low molecular weight hydrophobic polymer. The term "hydrophobic polymer", as used herein, refers to a water insoluble polymer. Useful hydrophobic polymers have an average molecular weight ranging from about 400 to about 50,000, preferably about 500 to about 20,000, most preferably about 600 to about 10,000. Examples of useful low molecular weight noncopolymerizable hydrophobic polymers include, but are not limited to, those selected from the group consisting of polystyrene resins such as Piccolastic™ A75, D125, and D150 available from Hercules Chemicals; poly(methylmethacrylate) (PMMA) resin; polybutadiene; poly(alpha-methylstyrene); butadiene-styrene block copolymers; and rosin esters such as Foral™ 85 and 105, available from Hercules, and mixtures thereof.

Preferably, the adhesive coated tapes of the present invention also utilize a releasable liner that covers the adhesive layer, or a release coating, such as a low adhesion backsize (LAB), coated on the nonadhesive side of the tape, to facilitate the winding of the tape into easy to use rolls. Preferably, an LAB coating is applied to the nonadhesive side of the tape using conventional coating methods in the textile industry.

It is preferred that the LAB comprise a water-based composition, however, solvent-based materials such as polyvinylcarbamate are also useful. Suitable components of the water-based LAB include, without limitation, polyethylenes, fluorochemicals, acrylates, silicones, vinyl copolymers, and combinations of these polymers with other polymers. For example, acceptable LABs useful in the tapes of the present invention are described in U.S. Pat. No. 4,728,571, the disclosure of which is herein incorporated by reference.

In an especially preferred embodiment, as described in U.S. Pat. No. 4,973,513, the disclosure of which is herein incorporated by reference, a water-based LAB is applied to the nonwoven sheet material immediately after the chemical binding agent is infused therein. In this regard, especially preferred LABs comprise the poly(dimethyl siloxane) and/ or acrylate polymers described as Release Coatings 1-15 of the U.S. Pat. No. 4,973,513 patent. After coating, the LAB and chemical binding agents infused into the nonwoven sheet materials are dried as described in the U.S. Pat. No. 4,973,513 patent.

Properties and Advantages

Applicant has surprisingly invented nonwoven sheet materials, and tapes formed therefrom, comprised of essentially nonfracturable fibers that can be made readily tearable (i.e., fracturable) in the cross web direction of the sheet or tape, and yet are conformable in use. In addition, these materials and tapes can also exhibit a number of other advantageous properties including, enhanced dry strength, comparable wet strength, tearability in the web direction, and a uniformity of strength in both the web direction and cross web direction. To date, no single prior art tape has been able to provide these advantages.

Typically, nonwoven sheet materials or tapes must sacrifice certain properties in favor of others. For example, to obtain a tape that is tearable in the cross web direction (e.g., a category I tape), overall tape strength, and in particular, wet strength, must be comprised. Likewise, to obtain a tape with good dry and wet strength (e.g., a category II tape), tearability, and often conformability, are lost. Thus, category I and II tapes are often limited in their application. Conversely, the nonwoven sheet materials and tapes of the present invention should find wide use throughout the health-care field, and anywhere else, where a strong, conformable, and readily tearable tape is required. Specifically, the nonwoven sheet materials and tapes of the present invention combine the wet and dry web direction tensile strength advantages of typical category II materials with the Hand (i.e., conformability) and cross web direction tear advantages of typical category I materials to provide materials with wide applicability in the health-care field, athletics, and other areas.

The particular tear characteristics of a nonwoven sheet material or tape of the present invention is evaluated according to the test procedures detailed below in the Test Methods section. This method provides a subjective measurement of whether a particular sheet or tape has excellent, good, fair, poor, or none (i.e., will not tear) tear characteristics, both in the web direction and the cross web direction.

In order to fall within the scope of the present invention, a nonwoven sheet material, or a tape made therefrom, must be readily finger-tearable in the cross web direction. As used herein, a nonwoven sheet material is readily finger-tearable when it exhibits at least fair tearability in the cross web direction. However, it is preferred that the nonwoven sheet material or tape exhibit at least good tearability, most preferably, excellent tearability, in the cross web direction. In addition, in a preferred embodiment, the nonwoven sheet materials or tapes of the present invention are also readily finger-tearable (i.e., exhibit "fair" tearability) in the web direction of the sheet or tape. Accordingly, the most preferred sheet materials and tapes of the present invention exhibit at least fair tear characteristics in both the web direction and cross web direction.

While finger-tearability is an important characteristic of the nonwoven sheet materials and tapes of the present invention, it should not be provided at the expense of the conformability (i.e., Hand) of the sheet materials and tapes. Accordingly, for a nonwoven sheet material and/or tape to fall within the scope of the present invention, it must also exhibit a Hand measurement of less than 250 grams for about a 20 cm wide sheet or tape. Preferably, the nonwoven sheet materials and/or tapes of the present invention exhibit a Hand measurement of less than 200 grams, most preferably less than 150 grams for about a 20 cm wide sheet or tape. When the Hand measurement exceeds 250 grams, the nonwoven sheet materials and/or tapes are generally too stiff to properly conform to the skin or other surface when in use.

The finger-tearability and Hand measurements for the nonwoven sheet materials and tapes of the present invention are affected by the particular pattern-embossing conditions used on these materials. Preferably, a square or linear cross web embossing pattern, as previously described, is used. When either of these patterns is employed, the nonwoven sheet materials and tapes of the present invention are readily finger-tearable in the cross web direction, and exhibit acceptable Hand measurements. In particular, the nonwoven sheet materials and tapes exhibit an easy, straight, and clean tear along the embossed lines of the linear or square patterns. However, when such materials are not pattern embossed, they become essentially non-tearable, or if torn, exhibit uneven tear and frayed edges. Similarly, when the entire surface area of the materials are hot calendered, they also are rendered essentially non-tearable. In addition, even if some of these materials maintain finger-tearability, they generally exhibit such high Hand measurements as to be essentially non-conformable.

The nonwoven sheet materials and tapes of the present invention also exhibit enhanced web direction tensile strength values per weight of fiber used in the fibrous web, that are comparable to those exhibited by typical category II materials. This is especially true with respect to the wet web direction tensile strength of these materials. Even though these nonwoven sheet materials and tapes are readily finger-tearable in the cross web direction, they still exhibit a web direction wet-break tensile strength of at least about 10N/cm, preferably at least about 15N/cm, and more preferably at least about 20N/cm. Likewise, the web direction dry-break tensile strength of these materials is also at least about 10N/cm, preferably at least about 15N/cm, and more preferably at least about 20N/cm. Thus, the nonwoven sheet materials and tapes of the present invention unexpectedly show no appreciable drop in web direction tensile strength when wet, as compared to dry. Conversely, typical category I cellulosic fiber materials (e.g., cellulose acetate and rayon) exhibit a 30%–40% reduction in tensile strength when wet. Furthermore, the finger-tearability of the sheet materials and tapes of the present invention is in direct contrast to typical category II materials that are essentially non-tearable in either the web direction or cross web direction.

Preferably, the nonwoven sheet materials and tapes of the present invention also exhibit enhanced tensile strength in both the web direction and cross web direction. In this regard, it is preferred that the ratio of web direction tensile strength to cross web direction tensile strength (i.e., WD:CD ratio) be less than 3:1, even more preferably less than 2:1. Furthermore, these materials also preferably exhibit a web direction dry elongation between about 15% to about 40%, more preferably from about 20% to about 30%.

Test Methods

The tear properties of the nonwoven sheet materials and tapes of the present invention are assessed by a test group of individuals who are familiar with such materials. Specifically, these individuals are familiar with medical tapes, athletic tapes, and the like, their uses, and application techniques.

Each test group comprises four individuals, who are supplied with example nonwoven sheet materials and tapes for evaluation. The test group evaluates these materials and tapes for ease of tear in both the web direction (i.e. downweb) and cross web direction (i.e. crossweb), tear initiation, straightness of the tear, smoothness of the torn edge, and the force required to complete the tear. Each of these tear characteristics are rated either excellent (4), good (3), fair (2), poor (1), or none (0) (i.e., the individual was unable to tear the material). The results reported by the four individuals comprising the test group are then combined for each example material, averaged for the four individuals, rounded to the nearest value, and reported as one of the above-noted tear characteristic values.

The tear characteristics of the nonwoven sheet materials was evaluated using 2.5 cm×30 cm or 5 cm×30 cm die cut samples, with the web direction tear characteristics being evaluated along the 30 cm length, and cross web direction tear characteristics along the 2.5 cm or 5 cm length. The tear characteristics of example tapes was evaluated on rolled tape having 2.5 cm or 5 cm widths, with the cross web direction tear characteristics being evaluated along the 2.5 cm or 5 cm length, while the web direction tear characteristics were evaluated along an approximately 20 cm length of the downweb portion of the tape.

The total Hand measurement in grams of example nonwoven sheet materials or tapes provides a measure of the drape/conformability of these materials. Those materials with a relatively high Hand value are stiff and nonconformable. Conversely, relatively low Hand values reflects soft, conformable materials. The Hand values reported for the following examples were obtained on a Thwing-Albert Handle-o-Meter™ Model No. 211-300 (Thwing-Albert Instrument Co., Philadelphia, Pa.), according to the procedures outlined in the instruction manual included with Model No. 211-300, the disclosure of which is herein incorporated by reference. All of the Hand measurements were performed on about 20 cm square sheet materials.

The tensile properties of the example nonwoven sheet materials and tapes reported herein were measured using an Instron™ tensile tester (Instron Corp., Canton, Mass.). The web direction and cross web direction tensile strength (i.e. dry break as reported in N/cm) and web direction elongation (percent) were measured in accordance with ASTM test method D-1682-64. The web direction wet tensile strength (i.e. wet break as reported in N/cm) was also measured in accordance with ASTM test method D-1682-64, after soaking the example materials for 5 minutes in deionized water maintained at 20° C. Thereafter, the test samples were blotted dry and immediately tested. After obtaining the above-noted tensile strength measurements, the ratio of web direction to cross web direction tensile strength (i.e. WD:CD) of the dry materials was calculated.

The invention will be further illustrated by reference to the following non-limiting Examples. All parts and percentages are expressed as parts by weight unless otherwise indicated.

EXAMPLES 1–8, AND COMPARATIVE EXAMPLES 9–18

The nonwoven sheet materials of Example 1–8 and Comparative Examples 9–18 were made on a Hergeth Random-Card machine (Hergeth-Hollingsworth, GMBH, Dülman, Germany), utilizing conventional nonwoven web formation techniques. The fiber composition, total fiber weight, chemical binder weight, and pattern embossing conditions employed with each of the Example and Comparative Example sheet materials are shown in Tables 1 and 3 below.

The nonwoven sheet materials of Examples 1–8, and Comparative Examples 9–18 utilized either a 0.75 denier, 38 mm, type L-30 polyethylene terephthalate (PET) staple fiber (Eastman Chemical Products, Inc., Kingsport, Tenn.), or a 1.25 denier, 38 mm, type T-121 PET staple fiber (Hoechst Celanese Corp., Charlotte, N.C.). In addition, the sheet materials of Comparative Examples 9–13 utilized a 1.5 denier, 40 mm, standard viscose processed rayon staple fiber (Courtauld's North America, Inc., New York, N.Y.) in conjunction with the above-noted PET staple fibers.

Either a 1.5 denier, 38 mm, Diawa™ binder fiber (a core-sheath fiber containing a crystalline polypropylene core, and a meltable polyethylene fiber sheath; Chori America, Inc., Los Angeles, Calif.), or a 2 denier, 38 mm, type K-54 binder fiber (a core-sheath fiber an oriented polyester core, and an amorphous, meltable polyester sheath; Hoechst Celanese Corp., Charlotte, N.C.), were utilized to form the nonwoven sheet materials of Examples 1–8 and Comparative Examples 9–18.

All of the nonwoven sheet materials of Examples 1–8, and Comparative Examples 10–14, and 18 were patterned embossed, or flat calendered, using the processing conditions listed in Tables 1 and 3 herein. Thereafter, the Example and Comparative Example sheet materials were saturated with an acrylic vinyl acetate copolymer latex chemical binder (No. 78-6283, National Starch and Chemical Co., Bridgewater, N.J.; a 45% solids latex, diluted to 25%–35% solids with deionized water). In addition, a poly(dimethyl siloxane) containing low adhesion backsize (LAB), described as Coating 1 of U.S. Pat. No. 4,973,513, was coated onto the sheet materials immediately after the chemical binder, using the method disclosed in the U.S. Pat. No. 4,973,513 patent, after which the sheet materials were dried in an oven.

Various mechanical and tear properties of the nonwoven sheet materials of Examples 1–8 and Comparative Examples 9–18 were determined according to the test methods described herein. The ratio of machine direction to cross machine direction tensile strength (MD:CD), machine direction dry tensile strength (MD DRY BREAK), machine direction wet tensile strength (MD WET BREAK), machine direction percent elongation (MD DRY ELONG.), Hand, and tear characteristics in both the machine direction and cross machine direction are reported in Tables 2 and 4 below.

TABLE 1

Fiber composition, total fiber weight, chemical binder weight, and pattern embossing conditions for the nonwoven sheet materials of Examples 1–8.

| Ex. No. | Fiber Comp. | Fiber Weight (g/m²) | Binder Weight (g/m²) | Emboss Pattern (%) | Emboss Condition (°C./MPa) |
|---|---|---|---|---|---|
| 1 | 70% 0.75 d PET 30% 1.5 d Diawa | 21 | 22 | square (26%) | 135/0.24 |
| 2 | 80% 0.75 d PET 20% 1.5 d Diawa | 21 | 23 | square (26%) | 135/0.24 |
| 3 | 90% 0.75 d PET 10% 1.5 d Diawa | 21 | 28 | square (26%) | 135/0.24 |
| 4 | 90% 0.75 d PET 10% 1.5 d Diawa | 21 | 18 | square (26%) | 135/0.24 |
| 5 | 80% 0.75 d PET 20% 2.0 d K-54 | 22 | 19 | square (26%) | 135/0.24 |
| 6 | 80% 1.25 d PET 20% 2.0 d K-54 | 21 | 21 | square (26%) | 160/0.28 |

TABLE 1-continued

Fiber composition, total fiber weight, chemical binder weight, and pattern embossing conditions for the nonwoven sheet materials of Examples 1–8.

| Ex. No. | Fiber Comp. | Fiber Weight (g/m$^2$) | Binder Weight (g/m$^2$) | Emboss Pattern (%) | Emboss Condition (°C./MPa) |
|---|---|---|---|---|---|
| 7 | 80% 1.25 d PET 20% 2.0 d K-54 | 21 | 20 | square (26%) | 132/0.19 |
| 8 | 80% 1.25 d PET 20% 1.5 d Diawa | 21 | 21 | square (26%) | 135/0.24 |

TABLE 2

Ratio of machine direction to cross machine direction tensile strength (MD:CD), machine direction dry tensile strength (MD DRY BREAK), machine direction wet tensile strength (MD WET BREAK), machine direction percent elongation (MD DRY ELONG.), Hand, and machine direction (MD) and cross machine direction (CD) tear characteristics of the nonwoven sheet materials of Examples 1–8.

| Ex. No. | MD:CD Ratio | MD Dry Break (N/cm) | MD Wet Break (N/cm) | MD Dry Elong. (%) | Hand (g) | Tear MD | Tear CD |
|---|---|---|---|---|---|---|---|
| 1 | 1.5:1 | 14 | 14 | 22 | 62 | fair | good |
| 2 | 1.8:1 | 16 | 16 | 20 | 49 | poor | fair |
| 3 | 1.4:1 | 15 | 15 | 23 | 103 | fair | good |
| 4 | 1.6:1 | 13 | 13 | 20 | 38 | fair | good |
| 5 | 1.4:1 | 13 | 13 | 18 | 35 | good | good |
| 6 | 1.7:1 | 20 | 17 | 25 | 42 | good | good |
| 7 | 1.7:1 | 17 | 16 | 28 | 35 | good | good |
| 8 | 2.9:1 | 20 | 19 | 38 | 44 | good | good |

TABLE 3

Fiber composition, total fiber weight, chemical binder weight, and pattern embossing conditions for the nonwoven sheet materials of Comparative Examples 9–18.

| CP. Ex. No. | Fiber Comp. | Fiber Weight (g/m$^2$) | Binder Weight (g/m$^2$) | Emboss Pattern (%) | Emboss Condition (°C./MPa) |
|---|---|---|---|---|---|
| 9 | 50% 0.75 d PET 30% 1.5 d Rayon 20% 1.5 d Diawa | 21 | 22 | none | na |
| 10 | 50% 0.75 d PET 30% 1.5 d Rayon 20% 1.5 d Diawa | 21 | 22 | linear (15%) | 129/0.17 |
| 11 | 50% 0.75 d PET 30% 1.5 d Rayon 20% 1.5 d Diawa | 21 | 22 | square (26%) | 127/0.21 |
| 12 | 50% 0.75 d PET 30% 1.5 d Rayon 20% 1.5 d Diawa | 21 | 22 | linear (15%) | 129/0.24 |
| 13 | 50% 0.75 d PET 30% 1.5 d Rayon 20% 1.5 d Diawa | 20 | 22 | flat@ (100%) | 127/0.17 |
| 14 | 70% 0.75 d PET 30% 1.5 d Diawa | 22 | 22 | flat@ (100%) | 135/0.24 |
| 15 | 70% 0.75 d PET 30% 1.5 d Diawa | 21 | 22 | none | na |
| 16 | 80% 0.75 d PET 20% 1.5 d Diawa | 21 | 24 | none | na |
| 17 | 80% 1.25 d PET 20% 2.0 d K-54 | 21 | 24 | none | na |
| 18 | 80% 1.25 d PET 20% 2.0 d K-54 | 21 | 19 | flat@ (100%) | 141/0.17 |

@These comparative sheet materials were not pattern embossed, but were flat calendered over essentially all (i.e., 100%) of their surface area.

TABLE 4

Ratio of machine direction to cross machine direction tensile strength (MD:CD), machine direction dry tensile strength (MD DRY BREAK), machine direction wet tensile strength (MD WET BREAK), machine direction percent elongation (MD DRY ELONG.), Hand, and machine direction (MD) and cross machine direction (CD) tear characteristics of the nonwoven sheet materials of Comparative Examples 9–18.

| Cp. Ex. No. | MD:CD Ratio | MD Dry Break (N/cm) | MD Wet Break (N/cm) | MD Dry Elong. (%) | Hand (g) | Tear MD | Tear CD |
|---|---|---|---|---|---|---|---|
| 9 | 1.2:1 | 12 | 8 | 23 | 66 | poor | fair |
| 10 | 1.3:1 | 9 | 6 | 23 | 58 | poor | good |
| 11 | 1.5:1 | 9 | 6 | 17 | 38 | good | good |
| 12 | 1.1:1 | 6 | 4 | 17 | 43 | poor | good |
| 13 | 1.2:1 | 11 | 8 | 14 | 130 | fair | fair |
| 14 | 1.6:1 | 15 | 15 | 19 | 167 | poor | none |
| 15 | 1.5:1 | 15 | 15 | 23 | 71 | none | none |
| 16 | 1.4:1 | 15 | 15 | 23 | 56 | poor | none |
| 17 | 2.2:1 | 19 | 18 | 42 | 38 | none | none |
| 18 | 1.8:1 | 21 | 21 | 20 | 87 | poor | poor |

A comparison of Tables 2 and 4 shows a marked difference in wet machine direction tensile strength between the nonwoven sheet materials of the present invention and comparative materials incorporating the cellulosic fibers (e.g., rayon) typically found in category I materials. Specifically, the nonwoven sheet materials of Examples 1–8 exhibit machine direction wet-break values between 13–19N/cm, while the rayon containing materials of Comparative Examples 9–13 exhibit values between 4–8N/cm, i.e., an average of 58% lower wet strength than the sheet materials of the present invention. Similarly, the machine direction dry-break values for the materials of Comparative Examples 9–13 are also substantially lower than those of the nonwoven sheet materials of Examples 1–8 (i.e., 6–12N/cm versus 13–20N/cm, respectively).

In addition, the poor or none cross machine direction tear characteristics of Comparative Examples 14–18 show that, even when fiber compositions analogous to those used in the nonwoven sheet materials of the present invention are employed, failure to pattern emboss the sheet materials, or complete flat calendering of the sheet materials, renders them essentially non-tearable. Furthermore, the comparative materials are also essentially non-tearable along the machine direction of the sheet. In contrast, the square embossing pattern used on the nonwoven sheet materials yields materials that are all finger-tearable in the cross machine direction, and substantially all finger-tearable in the machine direction. Further, it is believed that the poor machine direction tear characteristics of the Example 2 sheet material resulted from poor processing conditions. Specifically, the sheet material of Example 2 was formed at a 30% faster line speed than the other example materials. This variation in line speed would be expected to reduce the effectiveness of the thermal bonding resulting from pattern embossing, and thereby result in poorer tear properties.

EXAMPLES 19–22, AND COMPARATIVE EXAMPLES 23–34

The fibrous webs of the nonwoven sheet materials of Example 19–22 and Comparative Examples 23–34 were made by Veratec, Inc., of Walpole, Mass., on their proprietary process lines. The fibrous nonwoven webs were both randomly carded and hydroentangled prior to receipt by Applicant. Thereafter, the webs were further processed by Applicant to arrive at the Example and Comparative Example nonwoven sheet materials. The fiber composition, total fiber weight, chemical binder weight, and pattern embossing conditions employed with each of the Example and Comparative Example sheet materials are shown in Tables 5 and 7 below.

The nonwoven sheet materials of Examples 19–22, and Comparative Examples 23–34, utilized either a 0.75 denier, 38 mm, standard polyethylene terephthalate (PET) staple fiber, or a 1.2 denier, 38 mm, standard PET staple fiber (Hoechst Celanese Corp., Charlotte, N.C.). In addition, the sheet materials of Comparative Examples 23–26 utilized a 1.5 denier, 40 mm, standard viscose processed rayon staple fiber (Courtauld's North America, Inc., New York, N.Y.) in conjunction with the above-noted polyester staple fibers.

Either a 2 denier, 38 mm, Melty™ binder fiber (a core-sheath fiber containing an oriented polyester core, and a meltable polyester fiber sheath; Chori America, Inc., Los Angeles, Calif.), or a 2 denier, 38 ram, type K-52 binder fiber (a core-sheath fiber an oriented polyester core, and an amorphous, meltable polyester sheath; Hoechst Celanese Corp., Charlotte, N.C.), were utilized to form the nonwoven sheet materials of Examples 19–22 and Comparative Examples 23–34.

All of the sheet materials of Examples 19–22, and Comparative Examples 26, 30, and 32 were patterned embossed, or flat calendered, using the processing conditions listed in Tables 5 and 7 herein. Thereafter the hydroentangled and embossed sheet materials of Examples 19–22 and Comparative Examples 23–27, 29–30, 32 and 34 were saturated with an acrylic vinyl acetate copolymer latex chemical binder (No. 78–6283, National Starch and Chemical Co., Bridgewater, N.J.; a 45% solids latex, diluted to 25%–35% solids with deionized water). However, the nonwoven sheet materials of Comparative Examples 28, 31 and 33 were not saturated with any chemical binder. In addition, a poly (dimethyl siloxane)-containing LAB (i.e., Coating 1 of U.S. Pat. No. 4,973,513) was coated onto all the Example and Comparative Example sheet materials immediately after the chemical binder, using the method disclosed in the U.S. Pat. No. 4,973,513 patent, after which, the sheet materials were dried in an oven.

Various mechanical and tear properties of the nonwoven sheet materials of Examples 19–22 and Comparative Examples 23–34 were determined according to the test methods described herein. The ratio of machine direction to cross machine direction tensile strength (MD:CD), machine direction dry tensile strength (MD DRY BREAK), machine direction wet tensile strength (MD WET BREAK), machine direction percent elongation (MD DRY ELONG.), Hand, and tear characteristics in both the machine direction and cross machine direction are reported in Tables 6 and 8 below.

TABLE 5

Fiber composition, total fiber weight, chemical binder weight, and pattern embossing conditions for the nonwoven sheet materials of Comparative Examples 19–22.

| Ex. No. | Fiber Comp. | Fiber Weight (g/m$^2$) | Binder Weight (g/m$^2$) | Emboss Pattern (%) | Emboss Condition (°C./MPa) |
|---|---|---|---|---|---|
| 19 | 90% 1.0 d PET 10% 2.0 d Melty | 39 | 21 | square (26%) | 129/0.19 |
| 20 | 85% 0.75 d PET 15% 2.0 d K-52 | 46 | 20 | square (26%) | 135/0.18 |
| 21 | 80% 1.0 d PET 20% 1.5 d K-52 | 46 | 19 | square (26%) | 141/0.18 |
| 22 | 80% 1.0 d PET 20% 2.0 d K-52 | 44 | 18 | square (26%) | 141/0.15 |

TABLE 6

Ratio of machine direction to cross machine direction tensile strength (MD:CD), machine direction dry tensile strength (MD DRY BREAK), machine direction wet tensile strength (MD WET BREAK), machine direction percent elongation (MD DRY ELONG.), Hand, and machine direction (MD) and cross machine direction (CD) tear characteristics of the nonwoven sheet materials of Examples 19–22.

| Ex. No. | MD:CD Ratio | MD Dry Break (N/cm) | MD Wet Break (N/cm) | MD Dry Elong. (%) | Hand (g) | Tear MD | Tear CD |
|---|---|---|---|---|---|---|---|
| 19 | 1.4:1 | 25 | 24 | 17 | 105 | good | exce |
| 20 | 2.3:1 | 34 | 34 | 17 | 135 | good | good |
| 21 | 2.9:1 | 37 | 37 | 22 | 120 | good | good |
| 22 | 2.4:1 | 35 | 33 | 19 | 105 | good | exce |

TABLE 7

Fiber composition, total fiber weight, chemical binder weight, and pattern embossing conditions for the nonwoven sheet materials of Comparative Examples 23–34.

| Cp. Ex. No. | Fiber Comp. | Fiber Weight (g/m$^2$) | Binder Weight (g/m$^2$) | Emboss Pattern (%) | Emboss Condition (°C./MPa) |
|---|---|---|---|---|---|
| 23 | 85% 1.5 d Rayon 15 % 0.75 d PET | 45 | 21 | none | na |
| 24 | 75% 1.5 d Rayon 25% 0.75 d PET | 44 | 19 | none | na |
| 25 | 60% 1.5 d Rayon 25% 0.75 d PET 15% 2.0 d K-52 | 44 | 19 | none | na |
| 26 | 60% 1.5 d Payon 25% 0.75 d PET 15% 2.0 d K-52 | 44 | 19 | cross (15%) | 141/0.19 |
| 27 | 90% 1.0 d PET 10% 2.0 d Melty | 39 | 21 | none | na |
| 28 | 85% 0.75 d PET 15% 2.0 d K-52 | 46 | none | none | na |
| 29 | 85% 0.75 d PET 15% 2.0 d K-52 | 46 | 22 | none | na |
| 30 | 85% 0.75 d PET 15% 2.0 d K-52 | 46 | 19 | flat® (100%) | 135/0.18 |
| 31 | 80% 1.0 d PET 20% 2.0 d K-52 | 46 | none | none | na |
| 32 | 80% 1.0 d PET 20% 1.5 d K-52 | 46 | 17 | flat® (100%) | 141/0.18 |

TABLE 7-continued

Fiber composition, total fiber weight, chemical binder weight, and pattern embossing conditions for the nonwoven sheet materials of Comparative Examples 23–34.

| Cp. Ex. No. | Fiber Comp. | Fiber Weight (g/m²) | Binder Weight (g/m²) | Emboss Pattern (%) | Emboss Condition (°C./MPa) |
|---|---|---|---|---|---|
| 33 | 80% 1.3 d PET 20% 2.0 d K-52 | 44 | none | none | na |
| 34 | 80% 1.3 d PET 20% 2.0 d K-52 | 44 | 23 | none | na |

*These comparative sheet materials were not pattern embossed, but were flat calendered over essentially all (i.e., 100%) of their surface area.

TABLE 8

Ratio of machine direction to cross machine direction tensile strength (MD:CD), machine direction dry tensile strength (MD DRY BREAK), machine direction wet tensile strength (MD WET BREAK), machine direction percent elongation (MD DRY ELONG.), Hand, and machine direction (MD) and cross machine direction (CD) tear characteristics of the nonwoven sheet materials of Examples 23–34.

| Cp. Ex. No. | MD: CD Ratio | MD Dry Break (N/cm) | MD Wet Break (N/cm) | MD Dry Elong. (%) | Hand (g) | Tear MD | Tear CD |
|---|---|---|---|---|---|---|---|
| 23 | 2.2:1 | 27 | 12 | 18 | 240 | poor | fair |
| 24 | 2.0:1 | 22 | 13 | 20 | 305 | poor | fair |
| 25 | 2.1:1 | 30 | 16 | 29 | 260 | poor | fair |
| 26 | 2.1:1 | 26 | 16 | 19 | 125 | poor | fair |
| 27 | 1.9:1 | 25 | 24 | 17 | 140 | poor | poor |
| 28 | 2.3:1 | 30 | 0.4 | 37 | 85 | poor | none |
| 29 | 2.3:1 | 39 | 38 | 20 | 360 | poor | poor |
| 30 | 2.3:1 | 46 | 45 | 13 | 670 | fair | fair |
| 31 | 2.9:1 | 39 | 40 | 42 | 75 | none | none |
| 32 | 2.9:1 | 45 | 44 | 15 | 740 | poor | poor |
| 33 | 2.4:1 | 34 | 33 | 46 | 70 | none | none |
| 34 | 2.4:1 | 39 | 43 | 26 | 290 | poor | poor |

A comparison of the values reported in Tables 6 and 8 shows essentially the same results as described for the nonwoven sheet materials of Examples 1–8 (Table 2) and Comparative Examples 9–18 (Table 4). The rayon-containing sheet materials of Comparative Examples 23–26 all show substantially lower machine direction wet-break values (i.e., 12–16N/cm) than those of Example sheet materials 19–22 (i.e., 24–37N/cm). In addition, there is also a readily apparent difference between the machine direction dry-break values between the Example and Comparative Example materials (25–37N/cm for Examples 19–22; 22–30N/cm for Comparative Examples 23–26). In this regard, it should also be noted that the wet and dry machine direction tensile strength of the Comparative Example materials fall substantially below those of the Example materials, when cellulosic rayon fibers are used as the sole staple fiber of the web (i.e., Comparative Examples 23–24), or when rayon fibers are used in combination with tensilized non-fracturable stable fibers (i.e., Comparative Examples 25–26) of the type that are employed in the nonwoven sheet materials of the present invention.

Likewise, with the exception of Comparative Example 30, the similar fiber composition materials of Comparative Examples 27–29, and 31–34 are all essentially non-tearable in the cross machine direction. In contrast, the nonwoven sheet materials of Examples 19–22 all show good to excellent tearability in both the cross machine direction and machine direction. Even though the nonwoven sheet material of Comparative Example 30 exhibits fair tearability in both the cross machine direction and machine direction, it also exhibits a Hand measurement of 670 grams, making it so stiff as to be not useable as a conformable sheet material. Similarly, Comparative Example materials 24, 25, 29, 32, and 34 also exhibit Hand values exceeding those required of the nonwoven sheet materials of the present invention. In contrast, the nonwoven sheet materials of Examples 19–22 all exhibit Hand values of between 105–135 grams.

EXAMPLES 35–42, AND COMPARATIVE EXAMPLES 43–52

Example tapes 35–42, and Comparative Example tapes 43–52 use the nonwoven sheet materials of Examples 1–8, and Comparative Examples 9–18, respectively, as the backing materials for the tape constructions (See Tables 1 and 3). After pattern embossing, application of the chemical binder and LAB (per U.S. Pat. No. 4,973,513), and drying of these materials, a high-solids latex, acrylate-based pressure sensitive adhesive (PSA) (i.e., Example 5 of copending and co-filed U.S. patent application Attorney Docket No. 48167USA6A) was applied to the non-LAB-coated side of the nonwoven backing according to the procedures outlined in U.S. Pat. No. 3,121,021.

Various mechanical and tear properties of the tapes of Examples 35–42 and Comparative Examples 43–52 were determined according to the test methods described herein. Specifically, the machine direction dry tensile strength (MD DRY BREAK), machine direction percent elongation (MD DRY ELONG.), and tear characteristics in both the machine direction and cross machine direction are reported in Tables 9 and 10 below. In addition, Tables 9 and 10 also report the ratio of machine direction to cross machine direction tensile strength (MD:CD), the machine direction wet tensile strength (MD WET BREAK), and Hand of the Example and Comparative Example nonwoven sheet materials comprising the tape backings (See Tables 2 and 4 herein). The reported values for these properties remain essentially unchanged when a pressure-sensitive adhesive is applied to the nonwoven sheet materials to form the Example and Comparative Example tapes described herein.

TABLE 9

Ratio of machine direction to cross machine direction tensile strength (MD:CD), machine direction dry tensile strength (MD DRY BREAK), machine direction wet tensile strength (MD WET BREAK), machine direction percent elongation (MD DRY ELONG.), Hand, and machine direction (MD) and cross machine direction (CD) tear characteristics of the tapes of Examples 35–42.

| Ex. No. | MD: CD Ratio | MD Dry Break (N/cm) | MD Wet Break (N/cm) | MD Dry Elong. (%) | Hand (g) | Tear MD | Tear CD |
|---|---|---|---|---|---|---|---|
| 35 | 1.5:1 | 16 | 14 | 22 | 62 | fair | good |
| 36 | 1.8:1 | 17 | 16 | 21 | 49 | poor | fair |
| 37 | 1.4:1 | 16 | 15 | 23 | 103 | fair | good |
| 38 | 1.6:1 | 14 | 13 | 23 | 38 | fair | good |
| 39 | 1.4:1 | 14 | 13 | 19 | 35 | good | good |
| 40 | 1.7:1 | 21 | 17 | 23 | 42 | good | exec |
| 41 | 1.7:1 | 17 | 16 | 27 | 35 | good | good |

TABLE 9-continued

Ratio of machine direction to cross machine direction tensile strength (MD:CD), machine direction dry tensile strength (MD DRY BREAK), machine direction wet tensile strength (MD WET BREAK), machine direction percent elongation (MD DRY ELONG.), Hand, and machine direction (MD) and cross machine direction (CD) tear characteristics of the tapes of Examples 35–42.

| Ex. No. | MD: CD Ratio | MD Dry Break (N/cm) | MD Wet Break (N/cm) | MD Dry Elong. (%) | Hand (g) | Tear MD | Tear CD |
|---|---|---|---|---|---|---|---|
| 42 | 2.9:1 | 20 | 19 | 31 | 44 | good | good |

TABLE 10

Ratio of machine direction to cross direction tensile strength (MD:CD), machine direction dry tensile strength (MD DRY BREAK), machine direction wet tensile strength (MD WET BREAK), machine direction percent elongation (MD DRY ELONG.), Hand, and machine direction (MD) and cross direction (CD) tear characteristics of the tapes of Comparative Examples 43–52.

| CP. Ex. No. | MD: CD Ratio | MD Dry Break (N/cm) | MD Wet Break (N/cm) | MD Dry Elong. (%) | Hand (g) | Tear MD | Tear CD |
|---|---|---|---|---|---|---|---|
| 43 | 1.2:1 | 12 | 8 | 23 | 66 | poor | fair |
| 44 | 1.3:1 | 9 | 6 | 23 | 58 | poor | good |
| 45 | 1.5:1 | 9 | 6 | 17 | 38 | good | good |
| 46 | 1.1:1 | 6 | 4 | 17 | 43 | poor | good |
| 47 | 1.2:1 | 12 | 8 | 15 | 130 | fair | fair |
| 48 | 1.6:1 | 17 | 15 | 20 | 167 | fair | none |
| 49 | 1.5:1 | 17 | 15 | 23 | 71 | none | none |
| 50 | 1.4:1 | 16 | 15 | 22 | 56 | poor | none |
| 51 | 2.2:1 | 20 | 18 | 34 | 38 | none | none |
| 52 | 1.8:1 | 20 | 21 | 20 | 87 | poor | poor |

EXAMPLES 53–56, AND COMPARATIVE EXAMPLES 57–68

Example tapes 53–56, and Comparative Example tapes 57–68 used the nonwoven sheet materials of Examples 19–22 and Comparative Examples 23–34, respectively as the backing materials for the tape constructions (See Tables 5 and 7). Also, these Example and Comparative Example tapes used the same LAB and PSA adhesive coatings, as described for Examples 35–42 and Comparative Examples 43–52 herein.

Various mechanical and tear properties of the tapes of Examples 53–56 and Comparative Examples 57–68 were determined according to the test methods described herein. The machine direction dry tensile strength (MD DRY BREAK), machine direction percent elongation (MD DRY ELONG.), and tear characteristics in both the machine direction and cross machine direction are reported in Tables 11 and 12 below. In addition, Tables 11 and 12 also report the ratio of machine direction to cross machine direction tensile strength (MD:CD), machine direction wet tensile strength (MD WET BREAK), and Hand of the Example and Comparative Example sheet materials comprising the tape backings (See Tables 6 and 8 herein). As noted in Examples 35–42 and Comparative Examples 43–52, these values are essentially unchanged between the nonwoven sheet materials and resulting tapes coated with a pressure-sensitive adhesive.

TABLE 11

Ratio of machine direction to cross direction tensile strength (MD:CD), machine direction dry tensile strength (MD DRY BREAK), machine direction wet tensile strength (MD WET BREAK), machine direction percent elongation (MD DRY ELONG.), Hand, and machine direction (MD) and cross direction (CD) tear characteristics of the tapes of Examples 53–56.

| Ex. No. | MD: CD Ratio | MD Dry Break (N/cm) | MD Wet Break (N/cm) | MD Dry Elong. (%) | Hand (g) | Tear MD | Tear CD |
|---|---|---|---|---|---|---|---|
| 53 | 1.4:1 | 25 | 24 | 17 | 105 | good | exce |
| 54 | 2.3:1 | 37 | 34 | 16 | 135 | good | good |
| 55 | 2.9:1 | 39 | 37 | 21 | 120 | good | good |
| 56 | 2.4:1 | 35 | 33 | 18 | 105 | good | exce |

TABLE 12

Ratio of machine direction to cross machine direction tensile strength (MD:CD), machine direction dry tensile strength (MD DRY BREAK), machine direction wet tensile strength (MD WET BREAK), machine direction percent elongation (MD DRY ELONG.), Hand, and machine direction (MD) and cross machine direction (CD) tear characteristics of the tapes of Comparative Examples 57–68.

| CP. Ex. No. | MD: CD Ratio | MD Dry Break (N/cm) | MD Wet Break (N/cm) | MD Dry Elong. (%) | Hand (g) | Tear MD | Tear CD |
|---|---|---|---|---|---|---|---|
| 57 | 2.2:1 | 29 | 12 | 17 | 240 | poor | fair |
| 58 | 2.0:1 | 23 | 13 | 19 | 305 | poor | fair |
| 59 | 2.1:1 | 26 | 16 | 19 | 260 | poor | fair |
| 60 | 2.1:1 | 26 | 16 | 19 | 125 | poor | fair |
| 61 | 1.9:1 | nd | 24 | nd | 140 | poor | poor |
| 62 | 2.3:1 | nd | 0.4 | nd | 85 | nd | nd |
| 63 | 2.3:1 | nd | 38 | nd | 360 | nd | nd |
| 64 | 2.3:1 | 47 | 45 | 12 | 670 | fair | fair |
| 65 | 2.9:1 | 41 | 40 | 41 | 75 | none | none |
| 66 | 2.9:1 | nd | 44 | nd | 740 | nd | nd |
| 67 | 2.4:1 | 35 | 33 | 45 | 70 | none | none |
| 68 | 2.4:1 | 39 | 43 | 25 | 290 | poor | fair | nd = parameter values not determined for these Comparative Example materials.

The values reported in Tables 9–12 all demonstrate that application of a pressure-sensitive adhesive coating to the nonwoven sheet materials of Examples 1–8, and 19–22, and Comparative Examples 9–18, and 23–34, do not, in any significant way, change the properties reported for these materials. In this regard, all of the previously discussed advantages of the nonwoven sheet materials of the present invention apply equally well to tapes formed therefrom. Thus, the adhesive tapes of the present invention exhibit substantially higher machine direction dry and wet tensile strength (See Tables 9 and 11) than the rayon-containing tapes of Comparative Examples 43–47, and 57–60 (Tables 10 and 12). Also, these Examples are finger-tearable in the cross machine direction and machine direction, while those of Comparative Example tapes 48–52, 61–63, and 65–67 are not. Further, those Comparatives tapes that do exhibit fair tearability, also exhibit large Hand values outside of those provided by the tapes of the present invention.

EXAMPLES 77 AND 78, AND COMPARATIVE EXAMPLES 69-76

Examples 77 and 78 and Comparative Examples 69-76 demonstrate that the processing order of the present invention is important to prepare nonwoven sheet materials which are hand-tearable in the cross machine direction. Examples 77 and 78 were prepared according to the present invention, i.e., first pattern embossed in a manner to impart hand tearability in the cross web direction and then saturated with a chemical binder. This is more fully described below. Comparative Examples 69-76 were either prepared according to the processing order of U.S. Pat. No. 4,292,360, i.e., first saturating with a chemical binder and then pattern embossing or were prepared by first flat calendering or embossing in a manner that did not impart hand tearability in the cross web direction and then chemically binding.

The nonwoven sheet materials of Example 77 and 78 and Comparative Examples 69-76 were made on a Hergeth Random-Card web (Hergeth-Hollingsworth, GMBH, Dülman, Germany), utilizing conventional nonwoven web formation techniques. The fiber composition, total fiber weight, chemical binder weight, and pattern embossing conditions employed with each of the Example and Comparative Example sheet materials are shown in Table 13 below.

The nonwoven sheet materials of Examples 77 and 78, and Comparative Examples 69-76 utilized a 1.2 denier, 38 mm, type L-67 PET staple fiber (Hoechst Celanese Corp., Charlotte, N.C.). In addition, the sheet materials of Comparative Examples 73 and 74 utilized a 1.5 denier, 40 mm, standard viscose processed rayon staple fiber (Courtauld's North America, Inc., New York, N.Y.) in conjunction with the above-noted PET staple fibers.

A 2 denier, 38 mm, type K-54 binder fiber (a core-sheath fiber an oriented polyester core, and an amorphous, meltable polyester sheath; Hoechst Celanese Corp., Charlotte, N.C.), was utilized to form the nonwoven sheet materials of Examples 77 and 78 and Comparative Examples 69-76.

Comparative Examples 72 and 74 were first saturated with an acrylic vinyl acetate copolymer latex chemical binder (No. 78-6283, available from National Starch and Chemical Co., Bridgewater, N.J.; a 45% solids latex, diluted to 25-35% solids with deionized water). These samples were saturated with a binder before embossing occurred and followed the processing order of procedures disclosed in U.S. Pat. No. 4,292,360.

The nonwoven sheet materials of Comparative Examples 70, 72 74-76 and Examples 77 and 78 were patterned embossed, or flat calendered, using the processing conditions listed in Table 13 herein.

Thereafter, the Example 76 and 77 and Comparative Examples 69-71, 73 and 75 sheet materials were saturated with an acrylic vinyl acetate copolymer latex chemical binder. Example 77 was saturated with chemical binder No. 78-6283 identified above. Comparative Examples 71-73 and 74 were saturated with chemical binder No. 4260 available from National Starch and Chemical Co.; a 45% solids latex was diluted to 25-35% solids with deionized water. For Example 76, chemical binder No. 1019 available from Rohm & Haas was used; a 50% solids latex was diluted to 25-35% solids with deionized water.

Various mechanical and tear properties of the nonwoven sheet materials of Examples 77 and 78 and Comparative Examples 69-76 were determined according to the test methods described herein. The ratio of web direction to cross web direction tensile strength (WD:CD), web direction dry tensile strength (WD DRY BREAK), web direction wet tensile strength (WD WET BREAK), web direction percent elongation (WD DRY ELONG.), Hand, and tear characteristics in both the web direction and cross web direction are reported in Table 14 below.

TABLE 13

Fiber composition, total fiber weight, chemical binder weight, and pattern embossing conditions for the nonwoven sheet materials of Examples 1-8.

| Ex. No. | Fiber Comp. | Fiber Weight (g/m²) | Binder Weight (g/m²) | Emboss Pattern (%) | Emboss Condition (°C./MPa) |
|---|---|---|---|---|---|
| 69 | 80% 1.2d PET 20% 2.0 d K-54 | 22 | — | — | — |
| 70 | 80% 1.2 d PET 20% 2.0 d K-54 | 22 | — | Square 26% | 130/0.28 |
| 71 | 80% 1.2 d PET 20% 2.0 d K-54 | 21 | 23 | — | — |
| 72 | 80% 1.2 d PET 20% 2.0 d K-54 First saturated with binder, then embossed | 21 | 23 | Square 26% | 135/0.28 |
| 73 | 40% 1.5 d Rayon 40% 1.2 d PET 20% 2.0 d K-54 | 23 | 24 | — | — |
| 74 | 40% 1.2d Rayon 40% 1.2d PET 20% 2.0 d K-54 First saturated with binder, then embossed | 23 | 24 | Square 26% | 132/0.29 |
| 75 | 70% 1.2 d PET 30% 2.0 d K-54 | 40 | — | Flat 100% | 136/0.30 |
| 76 | 70% 1.2 d PET 30% 2.0 d K-54 First flat calendered, then saturated with binder | 40 | 36 | Flat 100% | 136/0.30 |
| 77 | 80% 1.2 d PET 20% 2.0 d K-54 First embossed, then saturated with binder | 31 | 63 | Linear 15% | 134/0.30 |
| 78 | 1.2d PET 2.0 d K-54 First embossed, then saturated with binder | 22 | 21 | Square 26% | 132/0.28 |

TABLE 14

Ratio of web direction to cross web direction tensile strength (WD:CD), machine direction dry tensile strength (WD DRY BREAK), web direction wet tensile strength (WD WET BREAK), web direction percent elongation (WD ELONG), Hand, and web direction (WD) and cross web direction (CD) tear characteristics of the nonwoven sheet materials of Comparative Examples 69-76 and Examples 77 and 78

| Ex. No. | WD: CD Ratio | WD Dry Break (N/cm) | MD Wet Break (N/cm) | MD Dry Elong. (%) | Hand (g) | Tear MD | Tear CD |
|---|---|---|---|---|---|---|---|
| 69 | * | * | * | * | * | * | * |
| 70 | 4.0:1 | 5 | 3 | 14 | 17 | Poor | Fair |
| 71 | 2.8:1 | 18 | 17 | 28 | 67 | Fair | Poor |
| 72 | 2.8:1 | 19 | 17 | 21 | 106 | Fair | Poor |

TABLE 14-continued

Ratio of web direction to cross web direction tensile strength (WD:CD), machine direction dry tensile strength (WD DRY BREAK), web direction wet tensile strength (WD WET BREAK), web direction percent elongation (WD DRY ELONG), Hand, and web direction (WD) and cross web direction (CD) tear characteristics of the nonwoven sheet materials of Comparative Examples 69–76 and Examples 77 and 78

| Ex. No. | WD: CD Ratio | WD Dry Break (N/cm) | MD Wet Break (N/cm) | MD Dry Elong. (%) | Hand (g) | Tear MD | Tear CD |
|---|---|---|---|---|---|---|---|
| 73 | 2.8:1 | 22 | 12 | 20 | 85 | Good | Poor |
| 74 | 2.8:1 | 22 | 12 | 20 | 88 | Good | Poor |
| 75 | 2.6:1 | 20 | 18 | 16 | 177 | Fair | Poor |
| 76 | 1.9:1 | 50 | 47 | 20 | 73 | Good | Fair |
| 77 | 2.5:1 | 40 | 38 | 21 | 75 | Poor | Good |
| 78 | 2.9:1 | 20 | 19 | 31 | 35 | Good | Good |

*Too low to measure

Example 78 exhibited good tear in the cross web direction as compared to Comparative Examples 72 and 74 which exhibited poor tear in the cross web direction. Comparative Examples 72 and 74 were pattern embossed in the same pattern as Example 78 but Comparative Examples 72 and 74 were saturated with a chemical binder before embossing occurred, i.e., according to the processing order disclosed in U.S. Pat. No. 4,292,360. Comparative Example 69 was not embossed or saturated with a chemical binder and therefore did not exhibit good tear properties. Comparative Example 70 was only embossed in a square pattern and was not chemically bonded and therefore did not exhibit good tear properties. Comparative Example 71 was saturated with a binder but was not pattern embossed and therefore did not tear well in either direction. Comparative Example 73 included rayon fibers and was not pattern embossed and failed to tear well in the cross web direction. Comparative Example 75 was flat calendered instead of pattern embossed and was not saturated with a chemical binder and therefore did not tear in the cross web direction. Comparative Example 76 was flat calendered and then saturated with a binder. Since the flat calendering did not pattern emboss the sample to impart hand tearability, the sample did not tear well in the cross web direction. Examples 77 and 78 were first pattern embossed to impart hand tearability and then saturated with a chemical binder according to the process of the present invention. Both Examples 77 and 78 had good tear in the cross web direction. Example 77 was only embossed with a linear pattern which allowed for good tear in the cross web direction (the direction of the lines) but poor tear in the web direction (across the linear embossing).

While in accordance with the patent statutes, description of the preferred weight fractions, processing conditions, and product usages have been provided, the scope of the invention is not to be limited thereto or thereby. Various modifications and alterations of the present invention will be apparent to those skilled in the art without departing from the scope and spirit of the present invention. The Examples described in this application are illustrative of the possibilities of varying the type, quantity, and ratio of fiber composition, as well as pattern embossing conditions to achieve properties for specific purposes.

Consequently, for an understanding of the scope of the present invention, reference is made to the following claims.

What is claimed is:

1. A nonwoven sheet material comprising a randomly interlaced fibrous web of tensilized nonfracturable staple fibers and binder fibers, wherein the fibrous web is first pattern embossed so as to be readily finger-tearable in the cross web direction, and subsequent to being pattern embossed is uniformly interbonded throughout by a chemical bonding agent, and further wherein the nonwoven sheet material exhibits a Hand measurement of less than 250 grams for about a 20 cm square sheet, and is readily finger-tearable in the cross machine direction and exhibits wet and dry break tensile strength of at least 10N/cm.

2. A nonwoven sheet material according to claim 1, wherein the tensilized nonfracturable staple fibers are selected from the group consisting of polycarbonate staple fibers, polysulfone staple fibers, polyester staple fibers, polyamide staple fibers, polyolefin staple fibers, polyacrylate staple fibers, and combinations thereof.

3. A nonwoven sheet material according to claim 1, wherein the tensilized nonfracturable staple fibers comprise oriented polyester staple fibers, oriented polyolefin staple fibers, or combinations thereof.

4. A nonwoven sheet material according to claim 2, wherein the polyester staple fibers comprise polyethylene terephthalate staple fibers.

5. A nonwoven sheet material according to claim 1, wherein the tensilized nonfracturable staple fibers exhibit a fineness of from about 0.7 denier to about 2 denier.

6. A nonwoven sheet material according to claim 1, wherein the binder fibers comprise thermoplastic binder fibers capable of melt-bonding with the tensilized nonfracturable staple fibers without fracturing or substantially weakening the tensilized nonfracturable staple fibers.

7. A nonwoven sheet material according to claim 6, wherein the thermoplastic binder fibers are selected from the group consisting of polyester binder fibers, polyolefin binder fibers, and combinations thereof.

8. A nonwoven sheet material according to claim 1, wherein the binder fibers exhibit a fineness of from about 0.5 denier to about 6 denier.

9. A nonwoven sheet material according to claim 1, wherein the binder fibers comprise core-sheath binder fibers.

10. A nonwoven sheet material according to claim 9, wherein the core-sheath binder fibers comprise a core of an oriented polyester fiber, an oriented polyolefin fiber, or combinations thereof, and an outer layer comprised of a thermoplastic polymer resin selected from the group consisting of a polyester resin, a polyolefin resin, and combinations thereof.

11. A nonwoven sheet material according to claim 1, wherein the tensilized nonfracturable staple fibers comprise from about 90% to about 60% by weight of the total weight of fibers comprising the fibrous backing, and the binder fibers comprise from about 40% to about 10% by weight of the total weight of fibers comprising the fibrous backing.

12. A nonwoven sheet material according to claim 1, wherein the weight ratio of tensilized nonfracturable staple fibers to binder fibers in the fibrous web is from about 5:1 to about 1:1.

13. A nonwoven sheet material according to claim 1, wherein the weight ratio of tensilized nonfracturable staple fibers to binder fibers in the fibrous web is from about 4:1 to about 2:1.

14. A nonwoven sheet material according to claim 1, wherein the tensilized nonfracturable staple fibers comprise polyester staple fibers of from about 0.75 denier to about 1.25 denier, the binder fibers comprise thermoplastic binder fibers of from about 1.5 denier to about 3.0 denier, and the weight ratio of tensilized nonfracturable staple fibers to binder fibers in the fibrous web is from about 4:1 to about 2:1.

15. A nonwoven sheet material according to claim 1, wherein less than about 50% of the fibrous web is pattern embossed.

16. A nonwoven sheet material according to claim 1, wherein less than about 30% of the fibrous web is pattern embossed.

17. A nonwoven sheet material according to claim 1, wherein the fibrous web is pattern embossed in a square pattern or a linear cross web direction pattern.

18. A nonwoven sheet material according to claim 1, wherein the chemical bonding agent comprises a water-based chemical binder.

19. A nonwoven sheet material according to claim 18, wherein the water-based chemical binder is selected from the group consisting of an acrylic binder, a styrene/butadiene binder, a vinyl acetate binder, a vinyl acetate/ethylene binder, a vinyl acetate/acrylate binder, a polyvinyl chloride binder, a polyvinyl alcohol binder, a polyurethane binder, and combinations thereof.

20. A nonwoven sheet material according to claim 18, wherein the water-based chemical binder comprises an acrylic/vinyl acetate copolymer latex.

21. A nonwoven sheet material according to claim 1, wherein the weight ratio of the tensilized nonfracturable staple fibers and binder fibers comprising the fibrous web to the chemical binding agent incorporated into the web, when dry, is from about 2:1 to 1:2.

22. A nonwoven sheet material according to claim 1, wherein the physical entanglement of the fibrous web is accomplished through hydroentanglement, needle tacking, or a combination thereof.

23. A nonwoven sheet material according to claim 1, wherein the nonwoven sheet material exhibits a Hand measurement of less than 200 grams for about a 20 cm square sheet.

24. A nonwoven sheet material according to claim 1, wherein the nonwoven sheet material exhibits a Hand measurement of less than 150 grams for about a 20 cm square sheet.

25. A nonwoven sheet material according to claim 1, wherein the nonwoven sheet material is readily finger-tearable in the web direction.

26. A nonwoven sheet material according to claim 25, wherein the nonwoven sheet material exhibits at least good finger-tearability in both the web direction and cross web direction.

27. A nonwoven sheet material according to claim 1, wherein the sheet material exhibits a web direction wet-break of at least about 10N/cm.

28. A nonwoven sheet material according to claim 1, wherein the sheet material exhibits a web direction dry-break of at least about 10N/cm.

29. A nonwoven sheet material according to claim 1, wherein the ratio of the web direction tensile strength to the cross web direction tensile strength of the sheet material is less than 3 to 1.

30. A nonwoven sheet material according to claim 1, wherein the ratio of the web direction tensile strength to the cross web direction tensile strength of the sheet material is less than 2 to 1.

* * * * *

UNITED STATES PATENT AND TRADEMARK OFFICE
CERTIFICATE OF CORRECTION

PATENT NO. : 5,631,073
DATED : May 20, 1997
INVENTOR(S) : John E. Riedel and Lauren K. Cran It is certified that error appears in the above-indentified patent and that said Letters Patent is hereby corrected as shown below:

Col. 24, line 12 and 13, "1-8" should read --69-76 and Comparative Examples 77 and 78-- and --Ex./C.P.-- should be added before "Ex. No.".

Col. 24, line 42, before "1.2d PET" insert --80%-- and before "2.0d K-54" insert --20%--.

Col. 26, line 40, "denjer" should read --denier--.

Col. 27, line 1, "denlet" should read --denier--.

Signed and Sealed this

Third Day of March, 1998

Attest:

BRUCE LEHMAN

Attesting Officer

Commissioner of Patents and Trademarks